United States Patent [19]
Zastera

[11] Patent Number: 5,621,770
[45] Date of Patent: Apr. 15, 1997

[54] METHOD AND SYSTEM FOR PROCESSING FIRST AND SECOND DIGITAL SIGNAL VERSIONS OF A SIGNAL IN A DIVERSITY RECEIVER

[75] Inventor: Bruce J. Zastera, Palatine, Ill.

[73] Assignee: Motorola, Inc., Schaumburg, Ill.

[21] Appl. No.: 298,876

[22] Filed: Aug. 31, 1994

[51] Int. Cl.$^6$ .................. H04B 7/08; H04L 1/06
[52] U.S. Cl. .............. 375/347; 375/350; 375/267; 455/135; 455/272; 455/33.3
[58] Field of Search ............... 379/59, 60; 455/101, 455/33.3, 33.1, 272, 273, 132, 133, 134, 135, 136, 140, 141; 375/347, 267, 349, 350, 346, 260; 340/825.89

[56] References Cited

U.S. PATENT DOCUMENTS

| | | | |
|---|---|---|---|
| 4,672,658 | 6/1987 | Kauchrad et al. | 379/63 |
| 5,203,018 | 4/1993 | Hirose | 455/61 |
| 5,239,541 | 8/1993 | Murai | 370/77 |
| 5,241,701 | 8/1993 | Andoh | 455/272 |
| 5,280,637 | 1/1994 | Larosa et al. | 455/134 |
| 5,345,406 | 9/1994 | Williams | 364/724.01 |
| 5,392,300 | 2/1995 | Borth et al. | 371/37.7 |
| 5,461,646 | 10/1995 | Anvari | 375/347 |
| 5,479,453 | 12/1995 | Anvari et al. | 375/348 |

FOREIGN PATENT DOCUMENTS

0206568A2  12/1986  European Pat. Off.

*Primary Examiner*—Wellington Chin
*Assistant Examiner*—William Luther
*Attorney, Agent, or Firm*—Donna Rogers Maddox

[57] ABSTRACT

A system for digital selection diversity includes receiving different versions of a signal sit different antennas (222, 226) of a receiver (210), and processing the different versions on separate branches each having a digital downconverter (224, 228) and filter (232, 236). The filters are controlled by a diversity switch selector (250) so that one acts to filter (the active branch), and the others decimate, their respective input signal versions, based on detected signal quality. The diversity switch selector also controls a demodulator (240) to demodulate the filtered signal. The decimated signals are used to provide both signal quality information, and phase history when a branch becomes active. When the signal quality on an inactive branch is determined to be the greatest, the diversity switch controller controls that branch's filter to switch to a filter mode, and the demodulator to use the last decimated sample for phase history when initially demodulating the signal version coming from the newly active branch.

19 Claims, 4 Drawing Sheets

METHOD AND SYSTEM FOR PROCESSING FIRST AND SECOND DIGITAL SIGNAL VERSIONS OF A SIGNAL IN A DIVERSITY RECEIVER

FIELD OF THE INVENTION

The present invention relates generally to communications systems and more particularly to a system for diversity reception of a signal.

BACKGROUND OF THE INVENTION

In a wireless communication environment in which one of the communication units is mobile, the reception of RF (radio frequency) signals often requires the use of diversity techniques to combat the effects of Raleigh fading. Various diversity reception methods have been used to reduce the effect of this fading, including such techniques as switching among antennas prior to discrimination, selection among several receivers, and combining signals from several receivers (e.g., max-ratio combining). However, there are drawbacks to these approaches. The use of pre-discrimination antenna switching in analog systems leads to phase discontinuities when the antennas are switched. This in turn results in "pops" in the recovered audio signal, which is unacceptable to most users. This result is even less tolerable in a digital receiver because it leads to unacceptable loss of information (voice and data). Diversity combining approaches like max-ratio combining may lead to acceptable quality, and often better quality than selection diversity techniques, but these come at the expense of a much more computationally intensive implementation. This typically means more expensive circuitry and higher power consumption, both of which are undesirable in mobile communications.

Selection diversity receivers require less circuitry or computations than diversity combining receivers, but prior art selection diversity approaches still typically rely on separate signal paths, each including all the necessary receiver circuitry from the demodulator forward to the antenna. FIG. I illustrates such a prior art diversity receiver. Receiver 110 receives spatially diverse versions of the same signal at antennas 119 114, 116. These signal versions are processed along different signal paths or branches via RF (radio frequency) front ends 122, 124, 126 and demodulators 142, 144, 146. The received signal strengths (RSSI) of the signal versions on each branch are determined in RSSI detectors 132, 134, 136, and the branch having the greatest RSSI is selected via diversity switch 150 using the RSSI information.

The problem with such a prior art selection diversity receiver is that it requires duplicate circuitry and signal processing constantly running in parallel for each signal path, up through and including demodulation. Only after the separate signal paths have been demodulated is a decision (selection) made about which signal to use for the output. This additional circuitry and computational demand ultimately leads to a more expensive receiver and higher power consumption.

Accordingly, there exists a need for a diversity receiver reducing circuitry and computational requirements, but while still performing diversity reception of high speed signals at an acceptable quality and substantially reducing the effects of fading.

SUMMARY OF THE INVENTION

In order to address this need and others, the present invention provides a method of processing first and second digital signal versions of a signal in a diversity receiver. The method includes the steps of processing the first and second digital signal versions by decimating one of the first and second digital signal versions to produce a decimated signal, and filtering the other of the first and second digital signal versions to produce a filtered signal. The filtered signal has a first sampling frequency and the decimated signal has a second sampling frequency. The first sampling frequency exceeds the second sampling frequency. The method further includes the steps of determining a signal quality of the decimated signal and a signal quality of the filtered signal, and outputting the filtered signal when the signal quality of the filtered signal is greater than the signal quality of the decimated signal.

According to another aspect of the present invention, a receiver for providing diversity reception that has at least first and second branches for receiving at least first and second signal versions of a signal is provided. The receiver includes a first and second digital downconverter on the first and second branches, a first and second filter/decimator responsive to the first and second downconverter, a first and second signal quality detector responsive to the first and second filter/decimator, and a diversity selector responsive to the first and second signal quality detector. The first and second digital downconverters are on the first and second branches, respectively. The first and second digital downconverters digitize and downconvert the first and second signal versions and output first and second digital signal versions, respectively. The first and second filter/decimators either decimate or filter the first and second digital signal versions. The first and second signal quality detectors determine the signal quality of the first and second digital signal versions, respectively. The diversity selector determines which of the first and second digital signal versions has greater signal quality. When the first digital signal version has greater signal quality, the diversity selector controls the first filter/decimator to filter the first digital signal version and output a filtered digital signal to a demodulator and controls the second filter/decimator to decimate the second digital signal version and output a decimated digital signal to the demodulator. The first filtered digital signal has a sampling frequency greater than the sampling frequency of the decimated signal.

In accordance with a further aspect of the present invention, the receiver comprises first and second filter and decimator devices coupled to first and second branches, respectively, a diversity switch controller responsive to the first and second filter and decimator devices, and a demodulator responsive to the diversity switch controller and the first and second filters. The demodulator comprises a phase detector responsive to the first and second filter and decimator devices. The phase detector determines phase information based on a filtered signal produced by the first filter and decimator device and a decimated signal produced by the second filter and decimator device.

DETAILED DESCRIPTION OF THE PREFERRED EMBODIMENT

Figure 2:
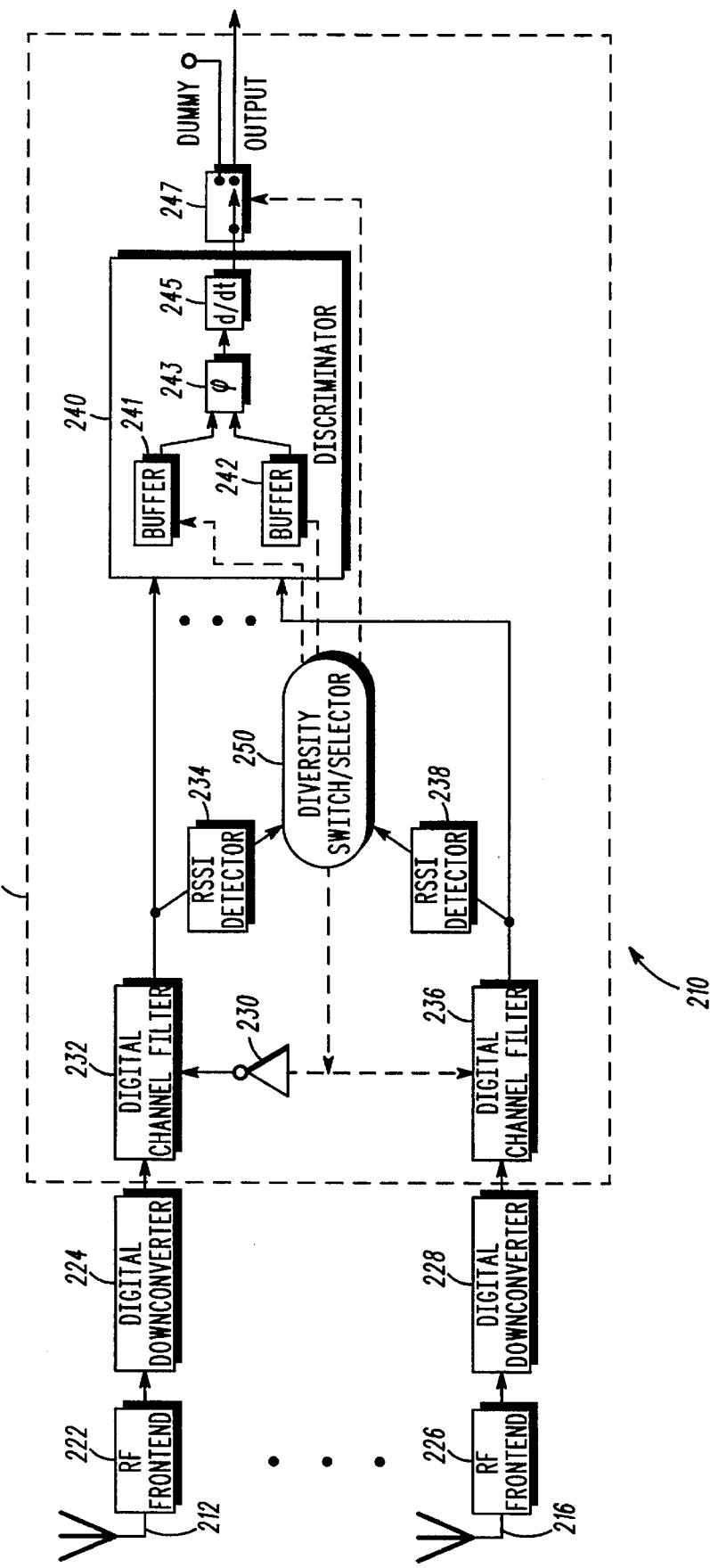
FIG. 2 is a block diagram of a diversity receiver according to a preferred embodiment of the invention.

These problems and others are met with a method and apparatus for diversity selection according to the present invention. FIG. 2 shows a block diagram of a presently preferred embodiment of the invention. In this embodiment the receiver 210 uses digital techniques to allow selection diversity with a single demodulator or discriminator 240 (for FM (frequency modulated) demodulation), but without introducing any phase discontinuity when switching between the branches starting with antennas 212, 216. While this embodiment illustrates the preferred implementation of a receiver for FM cellular or trunked radio communications, it should be understood that the invention also has application to other modulation schemes, including but not limited to DPSK (differential phase shift key), and with any type of wireless access communication system. The following description of this presently preferred embodiment is thus intended for illustration and not a limitation on the scope of the invention.

When the signal versions are received on the different branches via antennas 212, 216, they are processed and digitized via RF front ends 222, 226 and digital downconverters 224, 228, respectively. The digitized signals are then fed into filters 232, 236 and either decimated or filtered depending upon which branch has been selected as the active branch. Thus, for example, where the first branch is the active branch, filter 232 will act to filter (i.e., produce all the samples necessary for baseband signal recovery) the digitized signal version on the first branch. This filtered signal is then inputted to discriminator 240, via buffer 241, and demodulated via phase detector 243 and differentiator 245. The second branch, on the other hand, outputs a decimated sample from filter 236, which has been controlled to operate as a decimator. The decimated sample is inputted to buffer 242, but is discarded as long as the second branch remains inactive.

Figure 3:
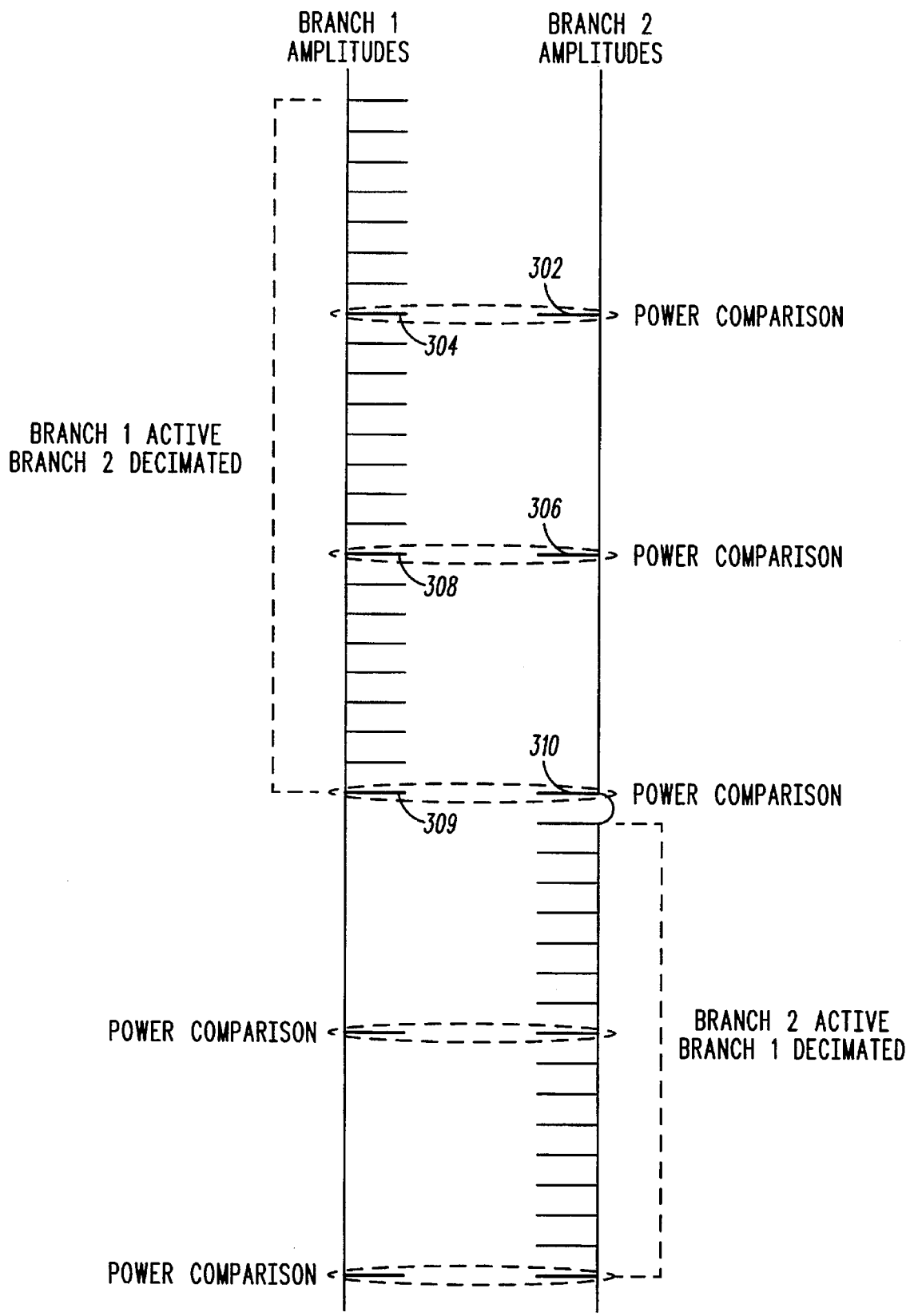
FIG. 3 is a graph illustrating signal information outputted from filters 232 and 236 of the diversity receiver of FIG. 2.

FIG. 3 illustrates a typical output for the first and second branches following filters 232, 236. While the first branch (branch 1 in FIG. 3) remains active, a continuous stream of samples, i.e. the filtered signal, in branch 1 is outputted to both RSSI detector 234 and buffer 241 of discriminator 240. Branch 2, on the other hand, is inactive so only periodic decimated samples are inputted to RSSI 238 and buffer 242 of discriminator 240. At the end of a predetermined number, or batch, of samples, the sample (e.g., 306) on the inactive branch and the corresponding sample (e.g., 308) on the active branch are used to determine the branch having the greatest signal quality. One skilled in the art will appreciate that there are a variety of ways in which the signal information may be used to determine relative signal quality, and that the batch sizes and number of samples considered will vary depending upon the specific circuitry design choices employed. In the case of the embodiment of FIG. 2, both the current samples 306, 308 and a predetermined number of prior samples 302, 304 at the end of prior batches are averaged for each branch and then compared.

In order to determine when to switch between branches, signal quality information from both branches is compared in diversity switch/selector 250. In the preferred embodiment this is accomplished by measuring the signal strength of the filtered and decimated signals on the active and inactive branches, respectively, via RSSI detectors 234, 238. One skilled in the art will appreciate that other forms of signal quality measurement may be employed other than RSSI, and that measurement could be made earlier in the branches (e.g., following digital downconverters 224, 228) in an appropriately configured receiver. The detected signal information is then compared at diversity selector 250 to determine which branch has the highest quality signal. Diversity selector 250 controls filters 232, 236 and buffers 241, 242 to output appropriate information depending upon which branch is selected as the active branch-the branch with the highest quality signal. In other words, while the first branch remains the active branch, diversity selector 250 will output a first control signal to filter 232 via inverter 230 controlling filter 232 to remain in filter mode; at the same time the first control signal will control filter 236 to remain in decimation mode. Further control signals will control: buffer 241 to output signal information to phase detector 243; buffer 242 to discard the stored samples; and switch 247 to discard the output of differentiator 245 during a transition between branches.

Thus, when it is determined that the inactive branch now has a higher signal quality, diversity selector 250 functions to switch the modes of filters 232 and 236, causing filter 232 to decimate further signal inputs, and filter 236 to continuously filter the signal on the second branch. At the same time, diversity selector 250 sends a control signal to buffer 242 to output the last decimated sample to phase detector 243 for purposes of providing initial phase history for the now active second branch. Switch 247 is controlled to discard, or send to a dummy output, the differentiator output, which is the difference between the phase information of the last sample 309 of the first branch and the phase information of decimated sample 310 of the second branch. Switch 247 then reconnects the output of differentiator 245 so as to output the differentiated signal information of the now active second branch.

Figure 1:
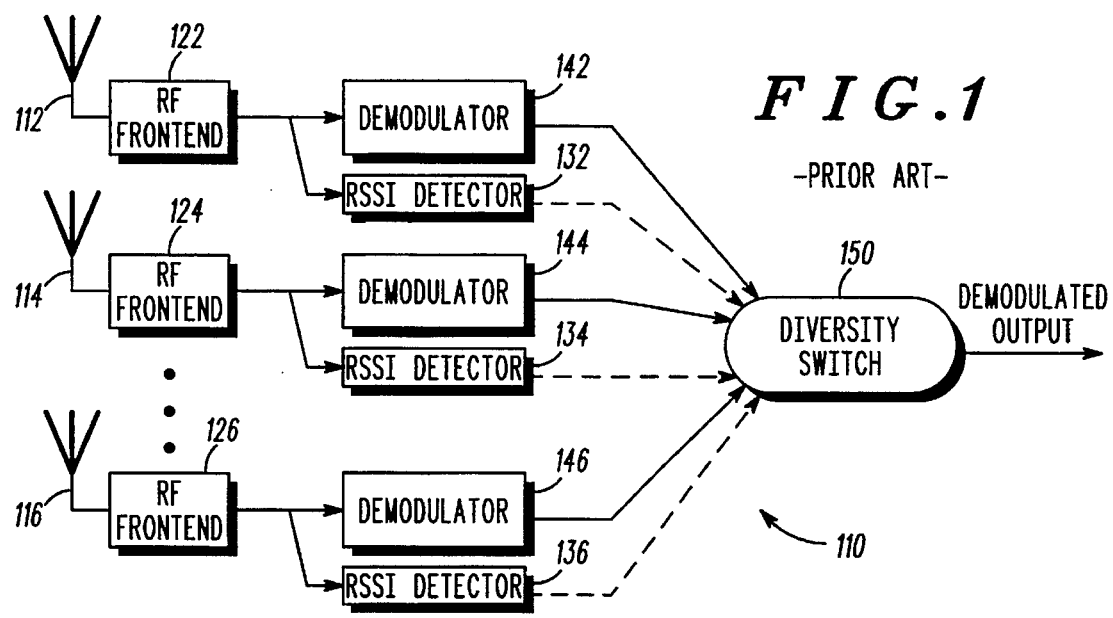
FIG. 1 is a block diagram illustrating a prior art selection diversity receiver.
Figure 4:
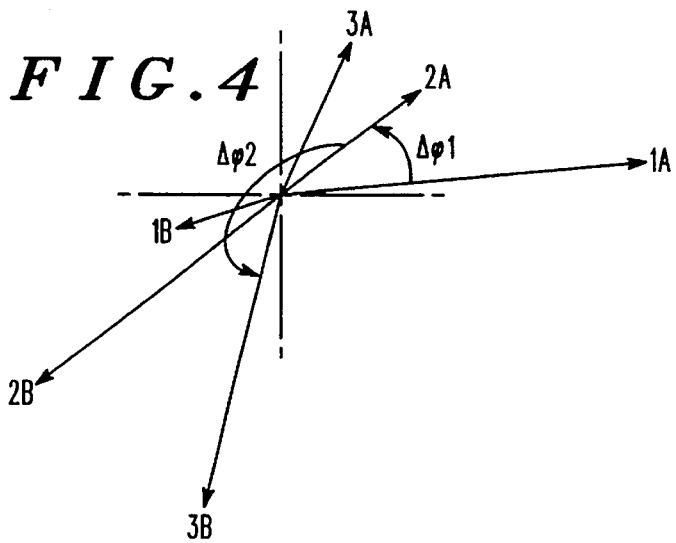
FIG. 4 is a graph illustrating phase discontinuity that may occur when switching between signal paths in an analog system prior to demodulation.
Figure 5:
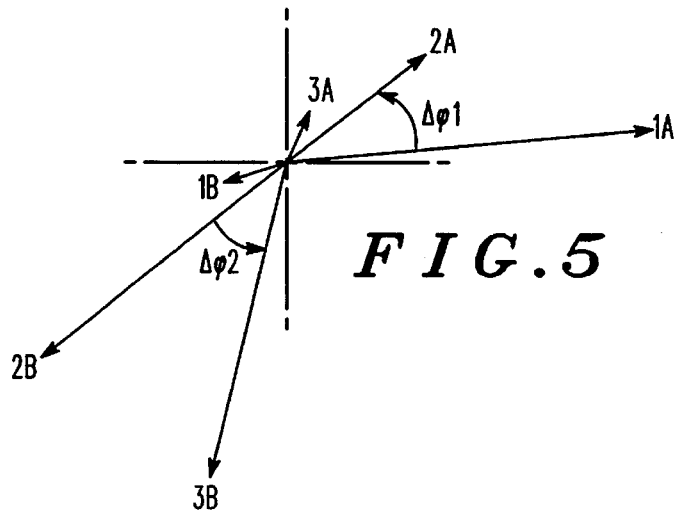
FIG. 5 is a graph illustrating how phase discontinuity may be avoided using the diversity receiver of FIG. 2.

This approach is particularly advantageous in that the last decimated sample 310 serves as an initial phase history for the differentiator 245, something which could not be accomplished with prior art techniques without employing duplicate discriminators for each branch. FIGS. 4 and 5 further illustrate how phase discontinuity is eliminated using phase history and the present invention. FIG. 4 illustrates the effect of switching if only one discriminator were used in a prior art analog implementation, without consideration of some form of phase history information for the inactive branch when switching it active. The numbered vectors in FIG. 4 represent the phase angles at successive sample instants for each of the two antennas 212. 216 (denoted as A and B for the respective first and second branches). Assuming that antenna 212 has been selected for the first branch (branch A), at sample instant 2 an RSSI calculation leads to a determination that the signal quality on the second branch is now stronger than on the first branch, so the second branch (branch B) will be used at sample instant 3. Thus, at sample instant 2 a phase difference $\Delta\phi 1$ has been calculated by differentiator 245 based on current sample 2A of the active branch and prior sample 1A. However, because the second branch is being switched in as the active branch, under prior art techniques at sample instant 3 a phase difference Δφ2 would be calculated using samples 2A and 3B. As can be seen, a large discontinuity will occur between samples 2 and 3 since these come from different signal paths. Such a large discontinuity will most likely result in undesirable outputs such as "popping" or lost data.

FIG. 5 illustrates how this effect is eliminated using the digital selection diversity technique according to the present invention. In this case, when branch B is switched to the active branch on sample 3, the discriminator 245 will have already precomputed previous sample 2B on the second branch. This sample is used to compute the difference between samples 2B and 3B so that no phase discontinuity will be experienced at the output of discriminator 240. The difference, if any is calculated, between sample 2A and 3B is discarded on a dummy output.

Figure 6:
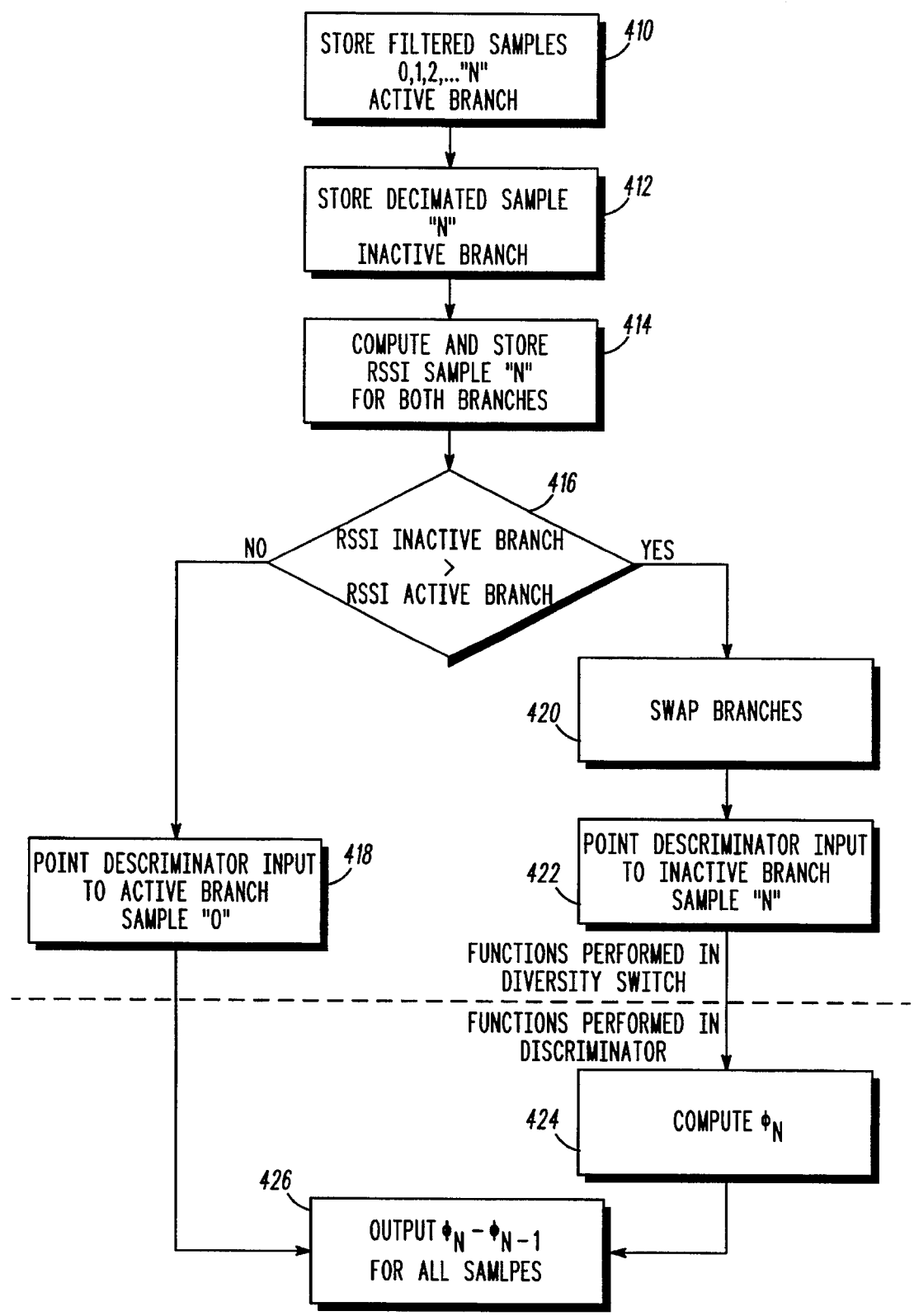
FIG. 6 is a flow chart illustrating the steps for selecting a signal path using the diversity receiver of FIG. 2.

FIG. 6 illustrates a flow chart for a presently preferred method of implementing the invention. Steps 410–418 show the steps by which the signal information is processed when there is no change in a then current active branch. When a determination has been made that the RSSI of the inactive branch is now greater than the RSSI of the active branch (step 416), the modes of filters 232, 236 are switched and a pointer is provided to discriminator 240 for the last decimated output of the previously inactive branch. Thus, the necessary phase history for switching the inactive branch into an active branch is provided (steps 420–424).

In the present embodiment, it has been assumed that simple differences are used to compute the output of discriminator 245. It is also possible to use more than two samples to obtain a more accurate estimate for the derivative of the phase, using circuitry like a multitap differentiator. However, buffers should still be maintained which contain a sufficient number of samples for each antenna, so that the derivative of the phase may be computed without loss of continuity or initial phase history each time a new branch is selected. In a software implementation, for example when diversity selector 250 and discriminator 240 are implemented in a digital signal processor (DSP) 260, this scheme merely requires modification of an input pointer passed to a single discriminator/demodulator routine when antenna paths are switched so that the correct sample history is used to compute the phase of the newly selected branch. In this manner, it is only necessary to discriminate the active branch so that a savings in processor bandwidth may be realized. The scheme is also advantageous in a digital hardware implementation since it is only necessary to build a single discriminator regardless of the number of receive antennas used.

There has thus been shown a digital selection diversity receiver eliminating the need for duplicate demodulators along the plural signal paths, and saving circuitry and/or computational capacity. While the invention has been described with reference to an illustrative embodiment thereof, it will be apparent to one skilled in the art that various modifications and changes can be made without departing from the spirit and the scope of the invention. For example, a skilled artisan will appreciate that although the digital receiver circuitry has been logically separated in the detailed description above, the actual implementation of these functions may be accomplished in a variety of different manners including, but not limited to, properly programming a DSP, coupling discrete components together, and using a combination of one or more application specific integrated circuits (ASICs). Nor is the invention limited to FM or cellular systems, as it may have application to any wireless access system in which at least one communication unit is capable of movement. Rather, the spirit and scope of the invention should be understood in view of the claims below.

I claim:

1. A method of processing first and second digital signal versions of a signal in a diversity receiver the method comprising the steps of:

(a) processing the first and second digital signal versions by decimating one of the first and second digital signal versions to produce a decimated signal, and filtering, but not decimating, the other of the first and second digital signal versions to produce a filtered signal, the filtered signal having a first sampling frequency and the decimated signal having a second sampling frequency, the first sampling frequency exceeding the second sampling frequency;

(b) determining a signal quality of the decimated signal and a signal quality of the filtered signal; and (c) outputting the filtered signal when the signal quality of the filtered signal is greater than the signal quality of the decimated signal.

2. The method of claim 1, wherein the signal is received as first and second signal versions via first and second antennas, respectively, the method further comprising prior to step (a):

digitizing and downconverting the first and second signal versions and outputting the first and second digital signal versions, respectively.

3. The method of claim 1, further comprising the step of determining phase information for the filtered signal and the decimated signal.

4. The method of claim 1, further comprising, when the signal quality of the decimated signal is greater than the signal quality of the filtered signal, the steps of:

outputting a decimated sample of the decimated signal to a demodulator; and (d) in the demodulator, determining a phase of the decimated sample and demodulating a first sample of a further filtered signal based on the determined phase of the decimated sample.

5. The method of claim 1, wherein said decimated signal and said filtered signal comprise a first and second set of samples respectfully and said first set of samples has a sampling interval less than a sampling interval of the second set of samples.

6. The method of claim 3, further comprising the step of outputting a demodulated digital signal based on the phase information.

7. The receiver of claim 6, wherein the filtered but not decimated signal has a sampling frequency greater than the decimated signal and further comprising a filter/decimation selection device coupled to the first filter/decimator and to the diversity switch controller.

8. The receiver of claim 18, wherein the demodulator includes a first buffer coupled to the first filter and decimator device and to the diversity switch controller and a second buffer coupled to the second filter and decimator device and to the diversity switch controller.

9. A receiver for providing diversity reception, the diversity receiver having at least first and second branches for receiving at least first and second signal versions of a signal, comprising:

(a) first and second filter and decimator devices coupled to the first and second branches, respectively;

(b) a diversity switch controller, responsive to the first and second filter and decimator devices;

(c) a demodulator responsive to the diversity switch controller and the first and second filters, said demodulator comprising a phase detector responsive to the first and second filter and decimator devices, the phase detector determining phase information based on a filtered, but not decimated, signal produced by the first filter and decimator device and a decimated signal produced by the second filter and decimator device.

10. The receiver of claim 9, further comprising first and second digital downconverters on the first and second branches, respectively.

11. The receiver of claim 9, further comprising first and second signal quality detectors coupled to the first and second filters, respectively.

12. The receiver of claim 11, further comprising a comparator coupled to the first and second signal quality detectors.

13. A receiver for providing diversity reception, the diversity receiver having at least first and second branches for receiving at least first and second signal versions of a signal, respectively, the receiver comprising:

(a) a first and second digital downconverter on the first and second branches, respectively, for digitizing and downconverting the first and second signal versions and outputting first and second digital signal versions, respectively;

(b) a first and second filter/decimator responsive to the first and second digital downconverter, respectively, for one of decimating and filtering the first and second digital signal versions;

(c) a first and second signal quality detector responsive to the first and second filter/decimator, respectively, for determining a signal quality of the first and second digital signal versions, respectively; and (d) a diversity selector responsive to the first and second signal quality detector for determining which of the first and second digital signal versions has greater signal quality, and responsive to the first and second filter/decimator for, when the first digital signal version has greater signal quality, controlling the first filter/decimator to filter and not decimate the first digital signal version and for outputting a filtered digital signal to a demodulator, and controlling the second filter/decimator to decimate and not filter the second digital signal version and for outputting a decimated digital signal to the demodulator; the first filtered digital signal having a sampling frequency greater than the sampling frequency of the decimated signal.

14. The receiver of claim 13 wherein the demodulator comprises: a phase determination device responsive to both the first and second filter/decimator for determining phase information for the filtered digital signal and the decimated signal, and a differentiator for differentiating the phase information and outputting a demodulated digital signal.

15. The receiver of claim 14, wherein, when the decimated signal has greater signal quality than the filtered digital signal;

the diversity selector is operable for controlling the first filter to decimate the first digital signal version and output a further decimated signal, for controlling the second filter to filter the second digital signal version and output a further filtered signal, and for controlling the demodulator to determine further phase information for the further digital signal, differentiate the further phase information and the phase information for the decimated signal, and output a further demodulated digital signal.

16. The receiver of claim 13 wherein the diversity selector is operable for determining which of the first and second digital signal versions has greater signal strength.

17. The receiver of claim 16 wherein the demodulator is a discriminator.

18. The receiver of claim 16 wherein the first and second signal quality detector, the diversity selector and the demodulator together comprise a digital processor.

19. The receiver of claim 13, wherein the selector controls the first filter/decimator to decimate the first digital signal version and output a decimated digital signal to a demodulator, and controls the second filter/decimator to filter and not decimate the second digital signal version and output a filtered but not decimated digital signal to the demodulator.

* * * * *

UNITED STATES PATENT AND TRADEMARK OFFICE
CERTIFICATE OF CORRECTION

PATENT NO. : 5,621,770
DATED : April 15, 1997
INVENTOR(S) : Zastera

It is certified that error appears in the above-indentified patent and that said Letters Patent is hereby corrected as shown below:

Abstract, line 2, "signal sit" should be --signal at--
Col. 6, line 55, "claim 18" should be --claim 6--

Signed and Sealed this

Thirty-first Day of March, 1998

Attest:

BRUCE LEHMAN

Attesting Officer

Commissioner of Patents and Trademarks